Inventor
William N. Parker

Jan. 8, 1952  W. N. PARKER  2,581,876
GRID STRUCTURE FOR ELECTRON DISCHARGE DEVICES
Original Filed March 30, 1949  3 Sheets-Sheet 2
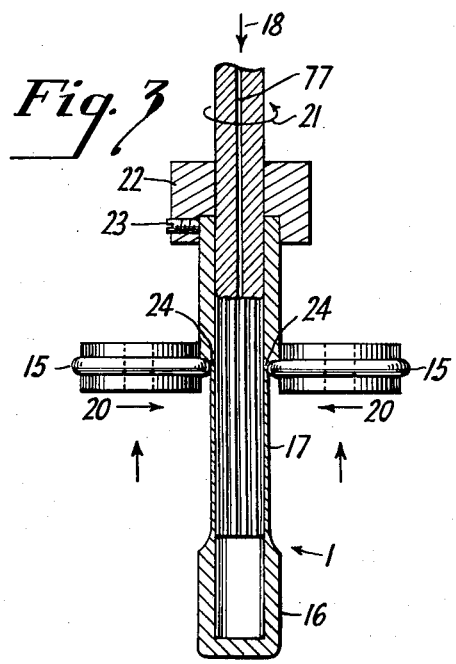
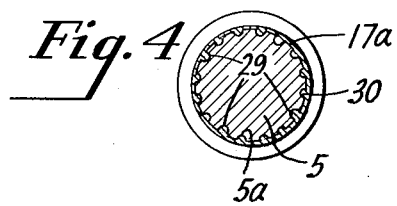
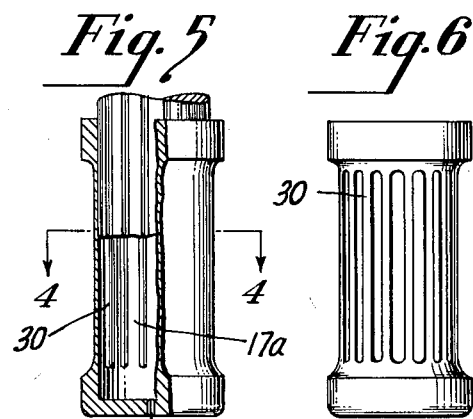
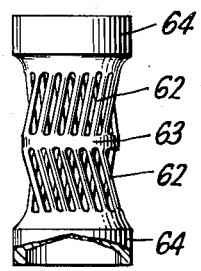
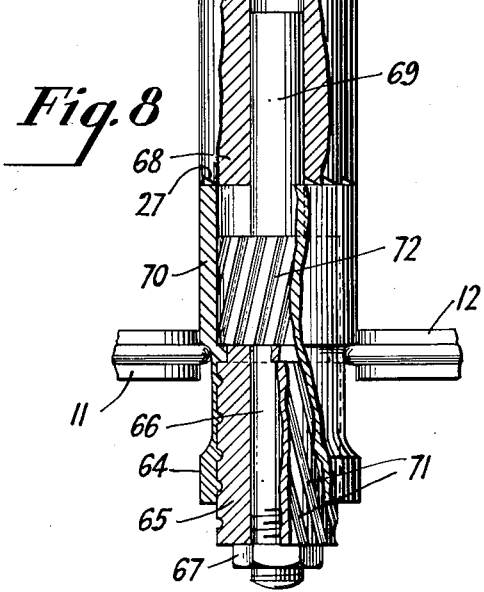
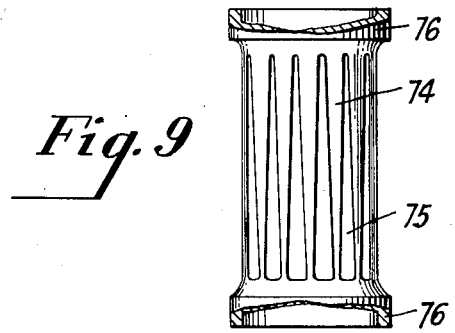
Inventor
William N. Parker
By William A. Zalesak
Attorney Jan. 8, 1952   W. N. PARKER   2,581,876
GRID STRUCTURE FOR ELECTRON DISCHARGE DEVICES
Original Filed March 30, 1949   3 Sheets-Sheet 3
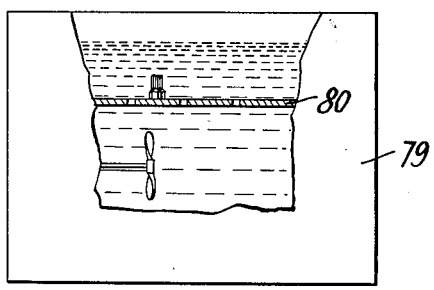
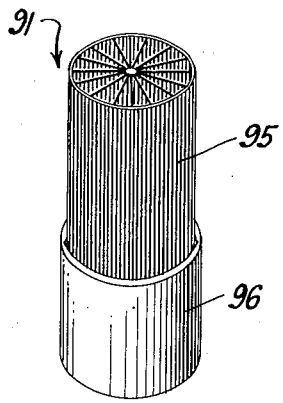
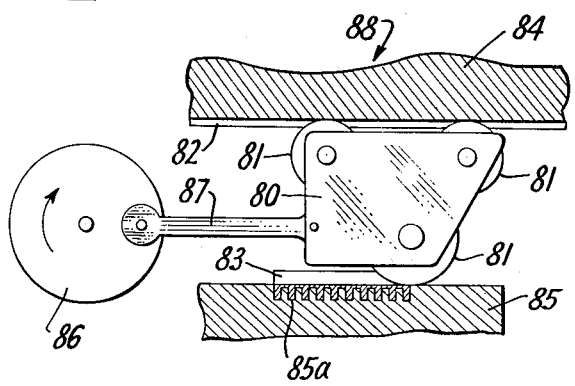
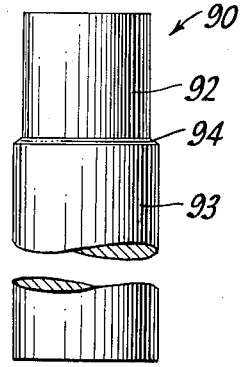
INVENTOR
WILLIAM N. PARKER
BY
William A. Zalesk
ATTORNEY Patented Jan. 8, 1952

2,581,876

UNITED STATES PATENT OFFICE 2,581,876

GRID STRUCTURE FOR ELECTRON DISCHARGE DEVICES

William N. Parker, Lancaster, Pa., assignor to Radio Corporation of America, a corporation of Delaware Original application March 30, 1949, Serial No. 84,406. Divided and this application November 22, 1949, Serial No. 128,783

6 Claims. (Cl. 313—348)

1

The invention relates to a novel electrode structure and method and apparatus for making the same, which is useful for making parts of the electrode structure of an electron discharge device, more particularly grids. However, the field of application of the invention is much broader and the invention may be practiced in the construction of various articles of manufacture.

This application is a division of my co-pending application, Serial No. 84,406, filed March 30, 1949, now Patent No. 2,565,623, granted August 28, 1951, which latter application is a continuation-in-part of the co-pending application of L. P. Garner and W. N. Parker, Serial No. 18,114, filed March 31, 1948. In the said application of L. P. Garner and W. N. Parker there is fully disclosed and claimed the method for reducing the wall thickness of tubing or flat sheets in the ratio of approximately 30 to 1 in one pass of the work through the apparatus and forming walls of foil-like thickness.

The process for reducing the wall thickness of the tubing is an important feature of the invention in that the means for reducing the wall thickness embodies a basic mechanical process including steps of fabricating the shapes which are substantially the end product without the use of additional apparatus, said products being characterized by inherent novel features not heretofore embodied in given specific structures of the prior art.

Although the invention in its various aspects has wide application, for purposes of illustration, it will be described particularly in connection with the manufacture of grid electrodes for electron discharge devices. From this disclosure, it will be appreciated that the invention involves not only an apparatus but also a method of operating the apparatus which constitutes a process of forming the resulting article. Furthermore, the formed articles per se embody novel features which are improvements over similar articles heretofore produced and used in tube construction.

In electron tubes having one or more grid electrodes it has been the usual practice to form each grid from separate parts as by welding, binding or swaging, into a desired cylinder or other shape. The operation is tedious and the resulting parts lack the mechanical accuracy required for closely spaced electrodes in tubes capable of high performance. The close mechanical tolerances desirable in multi-electrode discharge devices are difficult to maintain due to the inherent lack of rigidity of such electrode assemblies. Even though great care is used to make the spacing substantially uniform when the tube parts are assembled, the non-uniform stresses induced by the spot welding operation customarily employed heretofore in the manufacture of grids, induces well known disadvantageous features; for example one detrimental feature may be serious deformations occasioned by the use of heat in the exhaust process for driving out gas in the electrode structure. The joints between the multiplicity of wires and similar parts do not conduct heat as well as solid metal, which is a source of undesirable tube characteristics.

Electron tubes used to generate appreciable amounts of high frequency power are usually operated so that the grid electrode is positive with respect to cathode during a part of the alternating current cycle, with the result that the grid is bombarded by electrons and is consequently heated. Unless this heat is readily dissipated by radiation and/or end conduction, the grid wires may become sufficiently hot as to emit electrons, and inefficient and improper tube operation may result. Inadequate grid dissipation frequently seriously limits the output capability of high power tubes. On the other hand, when such tubes are operated at high radio frequencies, the electrodes must carry considerable current required by the inter-electrode capacities. This current may also cause objectionable heating of the grids unless the grid paths are of low electrical resistance to the high frequency currents. Conventional spot welded grids have high resistance junctions at the welds and the materials used usually have high electrical resistance.

The present invention eliminates or largely overcomes the above mentioned difficulties, as well as others, in that the source of these difficulties are removed by a novel construction which results from carrying out my novel process so as to produce an improved end product free from structural defects which are responsible for producing the aforesaid deleterious effects currently inherent in electrode structures and/or assemblies.

Thus a principal object of my invention is to provide a process whereby a grid electrode may be fabricated from a unitary piece of work material.

Another object is the provision of a process whereby novel grid structures may readily be fabricated which embody constructional features far superior to those heretofore attainable and yet may be readily fabricated at a reduced cost.

Yet another object of the invention is to provide parts useful in electron discharge and other devices, which parts have greatly enhanced electronic, mechanical, thermal, and/or electrical properties and are capable of economical mass production.

Another object is the provision of a method of making a one piece part for electron discharge devices which part may combine electronic functions with the properties of mechanical strength and accuracy, high thermal resistance, continuous low impedance paths for high frequency currents, and high electrical resistance for low frequency currents.

Another object of the invention is to provide a method of forming electrode elements from a work part such as tubing which is an integral piece and may be fabricated into a unitary structure, as for example the combination of a grid and its supporting member.

Another object is the provision of an improved electrode structure characterized by having several component parts integrally connected, thus avoiding any welding or equivalent operation in joining the various parts together, as for instance in the making of grids.

Another object of the invention is to provide an improved method of making wire electrodes for electron discharge devices which may be rigidly secured at each end yet will not bow or buckle when heated and which are easy to install.

A special object of the invention is the provision of a process for making an electrode by greatly reducing the wall thickness of the stock material, such as tubing, processing portions of the tubing into cavities of a tool, which leaves a web of extreme foil-like thinness between said processed portions, and subsequently removing the partly formed work from the apparatus in such a condition that the web portions may be removed in any suitable manner.

Other objects, advantages and results of the invention will manifest themselves from a reading of the following description in connection with the accompanying drawings.

Various applications of the invention are shown in the accompanying drawings in which:

Figure 3 is an enlarged cross section taken through the axis of the mandrel and metal cup, showing the wall thinning operation;

Figure 4 is an end cross section, along the line 4—4 of Figure 5, of the mandrel and tubing, showing the metal forming the grid wires pressed into the grooves with the web therebetween, both being shown for illustrative purposes with an exaggerated cross sectional thickness;

Figure 5 is an elevation, partly in section, of a portion of a mandrel and an incompleted grid embodying the invention;

Figure 6 is an elevation of the completed grid illustrated in Figure 5;

Figure 7 is an elevation of another form of a completed grid, having a central band joining reversely spiraled wires extending from opposite sides thereof;

Figure 8 is an elevation partly in section of the mandrel construction for making the type of grid shown in Figure 7;

Figure 9 is a side elevation of a still further modification of a completed grid;

Figure 10 is a section partly schematic of a modified form of apparatus utilized in forming a planar grid;

Figure 11 is an elevational view, partly in section of the etching step;

Figure 12 is an elevational view of a mandrel constructed in accordance with my invention, being a modification of the mandrel shown in Figure 1; and Figure 13 is an elevational view of a grid electrode embodying the invention, being a further modification of the electrode shown in Figure 6.

According to my present invention, I place a blank upon a suitable hard backing surface having a plurality of grooves formed therein. In accordance with the process described and claimed in the above-mentioned co-pending application of L. P. Garner and W. N. Parker, Serial Number 18,114, filed March 31, 1948, I effect a tremendous reduction in the wall thickness of the blank by transmitting the necessary forces through the portion of the blank to be worked rather than through the worked portion. As the wall thickness is being reduced the material of the blank is simultaneously forced into the grooves of the backing surface leaving a web portion interconnecting all of the relatively thicker portions which extend into the grooves. The interconnecting web portion is of foil-like thinness and has a cross section thickness of the order of .0004 inch which may readily be removed, as will be pointed out hereinbelow, leaving fine wires which are integral with common end pieces at each end.

Figure 1:
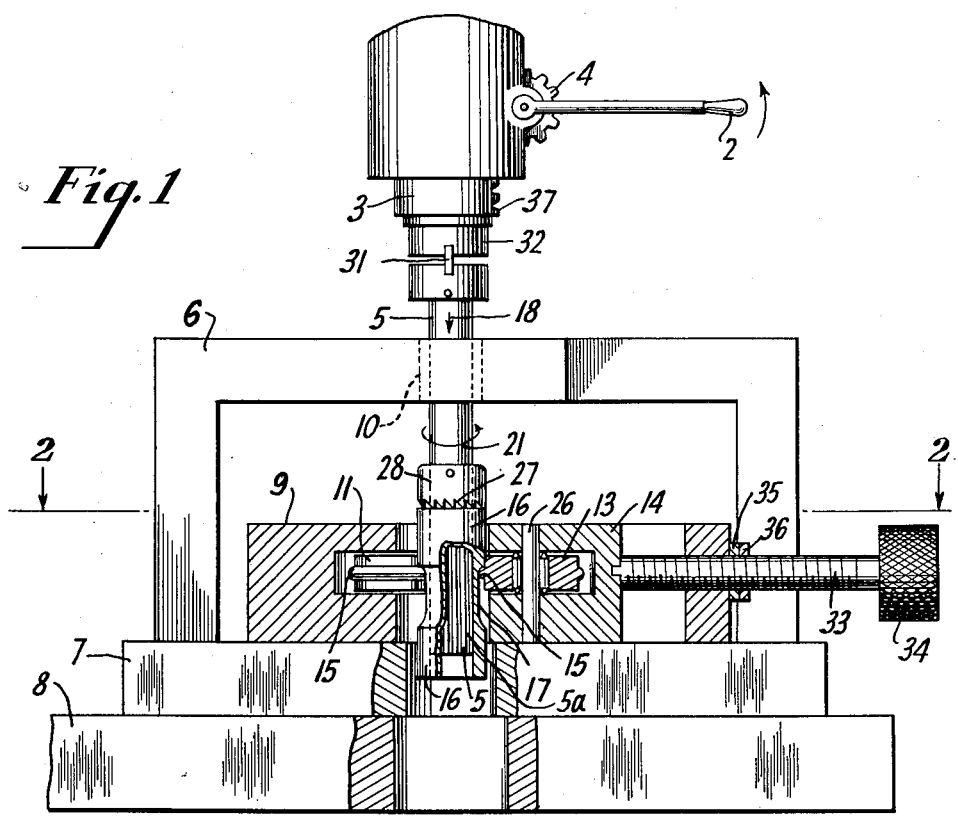
Figure 1 is an elevation, partly in section, of one form of apparatus for performing the invention.
Figure 2:
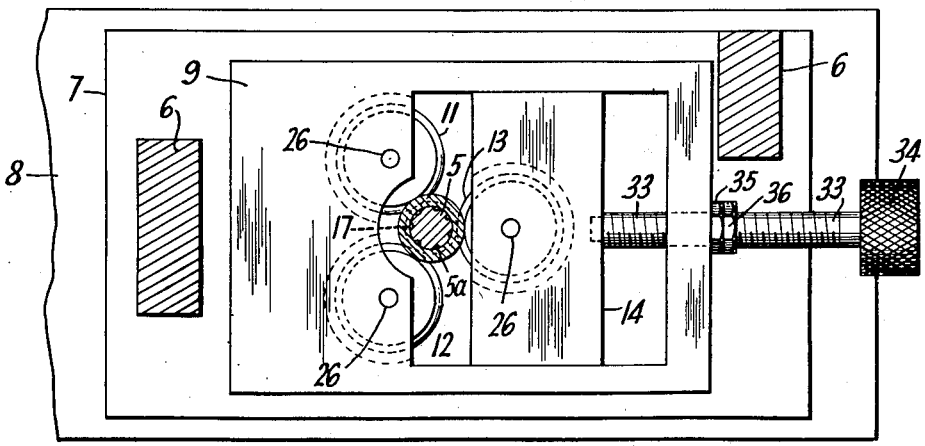
Figure 2 is a section taken on the line 2—2 of Figure 1.

Referring to the drawings, more particularly Figures 1 to 3, apparatus for practicing my invention in forming a grid having a cylindrical array of wires may comprise a machine tool similar to a drill press. Since these tools are well known, only the parts essential to an understanding of the invention are shown. A rotating shaft 32 is movable up and down by operation of a handle 2 which slides a sleeve 3 by means of a gear 4. A mandrel 5, having a plurality of slots 5a, has closely fitting bearings 10 in a yoke 6 which is in turn attached to a base 7. The base 7 in turn rests on a drill press table 8 which is connected mechanically to the upper part of the press, and supports a tube reducing device having an auxiliary frame 9 fitting within the yoke 6. The closely fitting bearings 10 and yoke 6 serve to keep the mandrel 5 running true about its axis and perpendicular to the upper surface of the base 7. The frame 9 carries nonadjustable rollers 11 and 12, and adjustable roller 13 mounted in a slide block 14 slidable within frame 9.

In Figure 3 is most clearly seen a work part or blank 1 in the process of having its wall thinned by the apparatus of Figures 1 and 2. The work part or blank 1 has a part 17 which has been thinned, the thickness of which has been shown exaggerated for purposes of illustration and actually is extremely thin, has yet thinner portions and of the order of a few 10,000ths of an inch as pointed out hereinabove, which forms the interconnecting web between the relatively thicker portions which extend into grooves 5a of the mandrel. The wall thickness of the metal tube 1 is reduced by the simultaneous application of axial pressure in the direction of arrow 18 (Fig. 3) and radial pressure in the direction of arrows 20 exerted while the tube is under the rollers. The mandrel 5 serves to back up the inner surfaces of the tube 1 in the region opposite the rollers, and to transmit the necessary rotational torque 21 to the work part through clamping devices which may comprise a collar 22 provided with a set screw 23 (Fig. 3), or a collar 28 provided with teeth 27. The relatively small radius bead 15 on rollers 11, 12 and 13 provides intense local pressure in region 24 of the tube section 17, causing plastic deformation and consequent thinning down of the thick wall of the tube. The worked portion flows out under the rollers and along the mandrel away from the portion to be worked with substantially no loss in volume of material. As a result the length of the worked portion will be extended in proportion to the reduction in wall thickness. All three rollers 11, 12 and 13 turn on precision needle bearings 26 as shown most clearly in Figures 1 and 2.

As pointed out, in the region where the grid is to be formed, a plurality of grooves 5a is provided in the mandrel 5 of a width and shape substantially corresponding to the dimensions of wires 30 (Fig. 6) of the grid to be formed. As an example there may be 60 exactly spaced grooves 5a, each .006 inch wide by .006 inch deep. These grooves may be ground in the hardened steel mandrel and any convenient expedient used to indicate the depth of the grooves during grinding.

Universal coupling 31 (Fig. 1) conveys to the mandrel 5 both the rotary motion of the shaft 32 and the axial motion of sleeve 3 without vibration or eccentricity so that mandrel 5 runs true with respect to the rollers. Any other suitable arrangement may be used. The rollers 11, 12 and 13 are preferably made of hardened steel carefully formed and polished. The hardness of the rollers should measure about 64 Rockwell C while the hardness of the mandrel should measure between 64 to 66 Rockwell C.

With the work piece 1, mandrel 5 and associated parts 28, 31 and 32 all rotating at a speed of about 700 revolutions per minute, feed screw 33 is advanced by means of knurled handle 34. This causes slide 14 to move toward work piece 1 and force rollers 11, 12 and 13 thereinto a predetermined depth as set by nut 35 and locknut 36. This depth is so chosen as to bring beads 15 to within a few 10,000ths of an inch of the mandrel so as to give the desired extremely thin interconnecting web 11a between grooves 5a and to facilitate the flow of metal into the depressions formed in the mandrel. Handle 2 is now operated so that the attached gear 4 and associated rack 37 of the drill press exert a downward axial force 19 on work piece 1; simultaneously the friction between the work piece 1 and the mandrel 5 causes them to be driven in unison and provides a driving power for the rollers 11, 12 and 13 that is resolved into radial force 21.

A detailed analysis of what is believed to take place in the work as it passes through the reducing device is set forth in the aforementioned co-pending application and I do not believe it is necessary to repeat the same here. However, it should be understood that in the present process and as pointed out in said co-pending application the necessary forces to form the work are transmitted to the work piece through the portion to be worked; thus once the worked portion has been reduced and forced out from under the rollers it is substantially free of any forces. Since the worked portion is not called upon to transmit any forces to the portion to be worked it is possible to effect tremendous reductions in the work by a single pass of the same through the reducing device.

Due to the elongation of the work piece the free or lower end thereof as viewed in the drawings projects over the lower end of the mandrel after the reducing process is started. In view of the extreme wall thinness of the worked portion it is necessary to provide some means for overcoming the substantial vacuum which obtains inside the work piece which extends below the end of the mandrel when the work blank has a closed end as in Figure 3. To overcome this I either provide a small air passage 77 in mandrel 5 or an air passage or hole 78 in the work piece (Fig. 5).

The partly completed grid shown particularly in Figure 5, upon removal from the mandrel is ready for further processing to remove web portions 17a from between the thicker portions of the work. The work is first thoroughly degreased as by washing in an acetone bath to insure uniform etching. Then the work is suspended in an acid bath tank 79 either on a tray 80 or by means of tongs or the like. I prefer to rough etch the work first in a bath of a 50 per cent solution of nitric acid in distilled water. This rough etch is carried to the point where the webbing first starts to disappear or when holes first start to appear therein. Then the final etching is carried out in a 30 per cent solution of nitric acid in distilled water. Here the etching proceeds at a considerably slower rate due to the lower concentration of the acid, permitting control over the grid wire size which determines the correct time to stop the etching. During the etching the bath is constantly agitated. As the etching proceeds, there will first be large ragged pieces of the webbing left on the grid wire edges. Gradually these ragged pieces become smaller and disappear leaving the edges of the grid wires smooth. As soon as this occurs the work should be removed from the etching bath, rinsed in a bath of chromic acid ($CrO_3$) after which it is further rinsed in running water for a sufficient length of time to remove the last traces of acid. Finally the grids may be rinsed in distilled water, acetone and then dried.

The invention is not limited in any way to the specific shapes and/or materials used for illustrative purposes. The process maybe used with a wide variety of tubular or planar parts or combinations of various diameters and/or wall thicknesses. Further, the process is applicable to practically all ductile materials from relatively soft copper as in the case of work piece 1 and aluminum to harder materials such as cold rolled steel, nickel, tantalum and molybdenum, as well as iron-nickel-cobalt alloys, Kovar, etc. The metal used will depend primarily on the properties required of the finished product. When metals other than copper are utilized, the etching bath concentrations vary accordingly. For example, I have found a suitable etching bath for tantalum to be hot hydrofluric acid with a trace or small quantity of nitric acid.

It should be further understood that the shape of the work blank before processing is not limited to having a cupped or closed end 16 (Fig. 3), but may be tubular with both ends open (Fig. 1) or the lower end may be provided with a perforated shield by a prior operation. The interior diameter of the work blank need not be uniform throughout, portions other than that processed to form the grid wires may be of different shape or diameter. Furthermore, the outside diameter may be varied as desired as the work is passing through the reducing device by merely adjusting handle 34 and nuts 35, 36.

Grids of various dimensions and geometry may be made by practicing the present process. For example we have made grid electrodes .420 inch in diameter for ninety wires .003 inch thick as well as grids .850 inch in diameter for ninety .007 inch diameter wires, with variations in lengths including six inches. Furthermore, the longitudinal wires of the grid need not be of uniform width. They may be wide at one end and narrow at the other with reversely tapered slots therebetween, such as the electrode of a single potential image tube disclosed in the application of Gardner L. Krieger and George A. Morton, filed June 28, 1946, Serial Number 679,928 now Patent No. 2,572,494, granted October 23, 1951, relating to Velocity Selection In Electron Tubes. Such a form of grid is shown herein in Figure 9, more fully referred to hereinafter.

With a properly shaped backing surface or mandrel the grid may be readily formed with an integral support of foil-like thinness.

By using a mandrel with spiral grooves a grid with spiral wires may be formed. In Figure 7 there is shown an electrode structure produced by this process which has two sections of reversely spiraled wires 62 joined at the center by band 63 which may have the same radial thickness as the wires. This structure automatically accommodates thermal expansion of the wires 62 by rotation of the middle band 63 even though the thicker ends 64 are rigidly anchored. Such an electrode structure is useful as a directly heated cathode or as a grid in an electron tube as described by Lloyd P. Garner in United States Patent No. 2,165,135. However, the manufacture of such a structure is greatly simplified by the use of the process which is included in the subject of the present invention. The mandrel in the present case is free to move with respect to the work and is made in two parts separable at the center groove which forms mid-band 63 so as to allow removal of the formed part.

The procedure for forming the zig-zag grid illustrated in Figure 7 may be explained with reference to Figure 8, which latter shows such a grid in the process of being formed. The mandrel consists of lower part 65 which is removable from center part 66 by loosening nut 67. Center part 66 is free to slide and turn with respect to upper part 68 by means of extension 69. Upper part 68 supplies the axial thrust and driving torque to work blank 70 by means of teeth 27. Grooves 71 are reversely complementary to grooves 72.

With metal work blank 70 revolving, rollers 11, 12 and 13 are fed in radially as before near end 64 which causes metal to enter grooves 71. Then as an axial force is exerted, in the manner heretofore explained, spiral wires 62 will form in grooves 71 with a thin web between them. As the forming process progresses over the junction of parts 65 and 66, metal flows into the peripheral groove forming mid-band 63. From this point on the keying action of mid-band 63 prevents relative movement between end 64 and parts 65 and 66 so that further lengthening of work blank 70 requires a separation or moving out of parts 65, 66 and 69 relative to part 68 and work blank 70. When the required length of forming has been attained the rollers are backed off and the assembly comprising parts 65, 66 and 67 and the formed sections 62, 63, 64 comprising the completed work part 70 are removed from upper part 68. Nut 67 is then removed and parts 65 and 66 unscrewed along spiral grooves 71 and 72 respectively, in the sequence indicated, leaving the substantially completed work part ready for completion by removing the foil-like webs between the wires 62.

From the foregoing description it will be obvious to workers in the art that various modifications of the invention will suggest themselves and it is my intention to cover all such modifications as come within the scope of the appended claims. For example the longitudinal wires of the grid need not be of uniform width as previously pointed out. As illustrated in Figure 9 the wires may take the form of slats 74 which are wide at one end and narrow at the other, and the webs 75 therebetween are reversely tapered. The ends of the slats 74 terminate in thicker end ferrules 76.

It should also be appreciated that the form of backing surface or mandrel may be other than cylindrical. The apparatus illustrated in Figure 10 is suitable for forming a blank or work piece 83 of sheet material such that after removal of the web portion it will yield a planar grid or the like. The apparatus may comprise a car 80 provided with rollers 81 which run in groove 82. The groove 82 is formed in a constraining member 84. In the arrangement shown, a reciprocatory motion may be provided by the crank 86 and connecting rod 87, which is the equivalent of the rotational motion of the previous example. The force 88 is at right angles to the principal motion, and may be applied by any external means (not shown). Suitable means which may be of a conventional form, would be required to maintain a desired limit of separation between the backing member 85 and the roller 51. The scanning pattern generated by the rapid reciprocating motion will be zig-zag, and the pitch thereof need not be constant across the width of the scanned area, i. e., it may be coarse, followed by a relatively fine pitch so as to produce a variable pitch scanning pattern. In any event, the scanning cycles should overlap to produce the proper scanning effect, and the tension stresses as in connection with the other modifications described herein, should be within the elastic limit of the portions undergoing extrusion.

As in the case of mandrel 5, backing member 85 is provided with grooves 85a. After removal of the work 83 it may be further processed by etching as pointed out hereinabove in connection with work piece 1.

Referring to Figure 4, it is also obvious that for the purpose of reinforcing or imparting added rigidity to the grid wires 30, a selected order or arrangement may involve making some of the wires substantially larger in cross section than the rest. This may be accomplished by making every third or fourth groove 29 of the mandrel 5 deeper, and thus permitting more of the metal of the work piece 1 to flow into these deeper grooves. This is possible because the grid wires or members always conform to the contour of the mandrel. Besides reinforcing the grid structure, the larger wires would correspondingly improve the thermal conductivity of the grid in the direction of the lead in wires.

It will be understood that the means for providing radial pressure 28 is not limited to the screw 33 shown in Figure 1 but may be of any suitable mechanism. Also, the radial positions of the rollers 11, 12 and 13 need not be constant during the longitudinal motion but may vary in predetermined steps and/or rates during practicing the process. The process, as indicated above, is applicable to practically all ductile materials from the relatively soft aluminum or copper to harder materials such as steel, iron-nickel-cobalt alloys, molybdenum and tungsten.

While the process as described utilizes round tubular sections over a smooth round mandrel and with external rollers, it is to be understood that this invention includes the adaptation where the one or more rollers are on the inside of the tubular work piece and the backing surface consists of the inside wall of a hard cylinder.

As pointed out hereinabove, a grid may be readily formed in accordance with my invention with an integral support. A mandrel 90 is shown in Figure 12 which is suitable for forming such a grid and integral support 91 (Figure 13). As shown, the upper portion 92 has grooves formed therein and has a smaller outside diameter than the lower portion 93. Between the lower portion 93 and upper portion 92 lies shoulder 94. The wires 95 and integral support 95 are formed in accordance with the process set forth hereinabove with respect to work piece 1 except that as rollers 11, 12 and 13 approach shoulder 94 they are backed off somewhat to clear the lower portion. The worked surface of support 96 affords a highly accurate locating or jigging surface which facilitates accurate positioning of the electrode.

I have also removed the foil-like web 17a by means of a turning tool mounted in a lathe. However, at the present time I prefer to remove the web by means of etching.

Various other modifications of the invention may be made in its application to various types of devices but the ones described and/or suggested may be regarded as illustrative of the scope of the invention which is only limited by the prior art and appended claims.

I claim:

1. A one piece electrode comprising a pair of end portions, one at each end of said electrode, and an array of elongated wires intermediate said end portions and integral therewith, said wires having a cross-sectional thickness of from .003 to .007 inches and being substantially thinner than said end portions.

2. An electrode comprising a one piece body having end portions one of which is of a predetermined thickness and a plurality of strands intermediate said portions and integral therewith, said strands being substantially thinner than said portion and having a cross-sectional thickness of from .003 to .007 inch.

3. An electrode comprising a seamless one piece elongated tubular body having end portions of a predetermined thickness and a cylindric array of spaced apart strands intermediate said portions and integral therewith, said strands being substantially thinner than said end portions.

4. A grid electrode for a high frequency electron discharge device, comprising a seamless one piece elongated tubular body having end portions of a predetermined thickness and a cylindric array of closely spaced filamentary strands intermediate said portions and integral therewith, said strands being substantially thinner than said end portions.

5. A one-piece grid electrode for an electron discharge device, comprising two end portions, and an array of elongated wires integral with said end portions, said wires having a cross-sectional thickness of from .003 to .007 inches and being substantially thinner than at least one of said end portions.

6. A one-piece grid electrode for an electron discharge device comprising a seamless tubular support member, a cylindric array of elongated wires individually extending from said support member and integrally joined therewith on their one ends, said wires having a cross-sectional thickness substantially less than that of said support member, and an end portion of the same order of thickness as said wires and of circular perimeter on which said wires individually terminate and to which they are integrally joined on their other ends.

WILLIAM N. PARKER.

REFERENCES CITED

The following references are of record in the file of this patent:

UNITED STATES PATENTS

| Number | Name | Date |
|---|---|---|
| 1,654,471 | Schrack | Dec. 27, 1927 |
| 2,264,735 | Baker et al. | Dec. 2, 1941 |
| 2,414,785 | Harrison et al. | Jan. 21, 1947 |